US012655374B2

(12) United States Patent
Oliver

(10) Patent No.: US 12,655,374 B2
(45) Date of Patent: **\*Jun. 16, 2026**

(54) COCKTAIL SMOKING CHIMNEYS AND METHODS FOR INFUSING SMOKE INTO COCKTAILS, BEVERAGES AND ALCOHOLIC DRINKS

(71) Applicant: Blake A. Oliver, Beacon, NY (US)

(72) Inventor: Blake A. Oliver, Beacon, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/581,630

(22) Filed: Feb. 20, 2024

(65) Prior Publication Data

US 2024/0191163 A1    Jun. 13, 2024

Related U.S. Application Data

(63) Continuation of application No. 17/158,179, filed on Jan. 26, 2021, now Pat. No. 11,932,835.

(51) Int. Cl.
*C12G 3/07* (2006.01)
*A23B 4/052* (2006.01)

(52) U.S. Cl.
CPC ................ *C12G 3/07* (2019.02); *A23B 4/052* (2013.01)

(58) Field of Classification Search
CPC .............. C12G 3/07; C12H 1/22; A23B 4/052
See application file for complete search history.

(56) References Cited

U.S. PATENT DOCUMENTS

| | | | |
|---|---|---|---|
| 2019/0364960 A1* | 12/2019 | Nguyen | A24F 1/30 |
| 2019/0387789 A1* | 12/2019 | Mehio | A24F 1/30 |
| 2021/0068409 A1* | 3/2021 | Sumner | C12G 3/07 |
| 2021/0227842 A1* | 7/2021 | Middleton | A21B 1/28 |

\* cited by examiner

*Primary Examiner* — Thien S Tran
(74) *Attorney, Agent, or Firm* — Charney IP Law LLC

(57) ABSTRACT

A cocktail smoking chimney for infusing smoke into a beverage includes a sealing base having a center and an outer perimeter. A chimney stack is aligned with the center of the sealing base and projects from a top major surface of the sealing base. A combustion chamber is disposed within the chimney stack. A smoke directing lip is aligned with the center of the sealing base and projects from a bottom major surface of the sealing base. The combustion chamber is aligned with the smoke directing lip. One or more smoke transfer openings are formed in the sealing base, each having an upper end in fluid communication with the combustion chamber and a lower end that is surrounded by the smoke directing lip. The sealing base, the chimney stack, and the smoke directing lip are made of wood. A combustible material may be packed into the combustion chamber.

20 Claims, 15 Drawing Sheets

(place wood powder of spices in chimney)

(light powder with torch)

(cover with glass)

(30s-60s)

(fill glass with cocktail)

(Enjoy)

COCKTAIL SMOKING CHIMNEYS AND METHODS FOR INFUSING SMOKE INTO COCKTAILS, BEVERAGES AND ALCOHOLIC DRINKS

CROSS-REFERENCE TO RELATED APPLICATIONS

The present patent application is a continuation application of U.S. patent application Ser. No. 17/158,179 filed Jan. 26, 2021, which is related to U.S. patent application Ser. No. 29/767,445, filed on Jan. 22, 2021.

BACKGROUND OF THE INVENTION

Field of the Invention

The present patent application is generally related to systems and devices for generating smoke, and is more specifically related to system, devices and methods for infusing smoke into beverages such as cocktails, beverages and alcoholic drinks.

Description of the Related Art

There have been a number of efforts directed to generating smoke and infusing smoke into food and beverages. For example, U.S. Pat. No. 6,481,344 to Green et al. discloses a smoke generating device for use in providing flavored smoke in a controlled manner. The smoke generating device includes a non-combustible, sealed, pressurizable container. An organic matter disposed within the container is capable of producing a smoke without igniting. The container has at least one perforation, which enables the container to become pressurized so that smoke flows out of the container in a controlled direction and at a velocity that does not combust during heating of the container.

U.S. Pat. No. 6,705,213 to Thomas discloses a smoke generator having an air pump with a control valve to supply a continuous controllable air supply to a smoking fuel disposed on a grid in a fire box. Smoke is directed to a food processor from a smoke output within the fire box and above the grid. A chimney extends from the top of the fire box. The first box is filled with a fuel that is not in the air stream so it does not burn. As the fuel on the grid is consumed, fuel from the chimney drops onto the grid, which provides a continuous feed of fresh fuel so that the smoke generator can, while unattended, generate a uniform controllable stream of smoke over a long period of time. A disposable fuel cartridge is provided for ease of use.

U.S. Pat. No. 6,971,305 to Thomas discloses an assembly for generating a continuous stream of smoke for food processing (e.g., barbecue cooking). The assembly includes a reusable cartridge holder for holding upright a disposable smoke generating cartridge. The cartridge includes an outer covering enclosing a chamber. The covering includes a perforated top, a non-perforated upper portion designed to not burn during the process, and a readily combustible lower portion. At the bottom of the chamber is a readily combustible tinder material that is easily set afire by the burning lower portion. The balance of the chamber is filled with wood pellets that smolder and emit desirable smoke when ignited by the tinder, the smoke passing upward through the perforated top. The convection currents produce a stream of smoke without the need for a fan. The pellets do not fall through the cartridge after the bottom portion burns away because they swell up and are held in place within the upper portion.

US 2020/0107565 to Swayne et al. disclose a device for injecting dry smoke into a food product. The device includes a smoke injector having an external wall with a plurality of apertures formed therein that communicate with a smoke-injector conduit. The smoke-injector conduit is in fluid communication with a smoke reservoir that houses dry smoking media therein. A fan directs dry smoke produced from the dry smoking media into the smoke-injector conduit so that the dry smoke is eluted through said plurality of apertures in order to introduce the dry smoke to an interior of a food product that has been impaled by the smoke injector.

US 2020/0221718 to Flood et al. disclose a smoke generation pod for use in a smoke generation system. The smoke generation pod includes an enclosure that has disposed therein a material such as wood that is heated or ignited by a heating element housed within the smoke generation pod, receiving energy from an induction coil. The smoke generation pod has an input vent for accepting air and an output vent for distributing smoke. The smoke is routed to an object such as a glass (with or without a liquid there within) for infusing the smoke into the liquid or onto the object. In some embodiments, the output vent has a filter. In some embodiments, some filters remove some or all of the carcinogens from the smoke that is emitted.

CN 202311122 discloses a low-temperature smoke generator. The smoke generator includes an outer barrel, an inner barrel and a base, whereby the shape of the base is matched with those of the outer barrel and the inner barrel. The inner barrel is arranged in the outer barrel. The outer barrel and the inner barrel are arranged on the base. The bottom of the outer barrel is open and the top of the outer barrel is sealed. The top of the inner barrel is open and the bottom of the inner barrel is sealed. An annular smoke and air space is formed among the outer barrel, the inner barrel and the base. A side wall of the outer barrel is equal to or higher than that of the inner barrel. The base is a concave or convex annular cylinder. The low-temperature smoke generator has a simple structure and a small overall volume, is convenient to detach and has a low cost.

In spite of the above advances, there remains a need for improved systems, devices and methods for infusing smoke into beverages such as cocktails. There also remains a need for efficient, economical, mobile, and simplified systems, devices and methods for infusing smoke into beverages.

SUMMARY OF THE INVENTION

In one embodiment, a cocktail smoking chimney for infusing smoke into a beverage (e.g., a cocktail) preferably includes a sealing base having a top major surface and a bottom major surface, a chimney stack projecting from the top major surface of the sealing base, a combustion chamber disposed within the chimney stack, and a smoke directing lip projecting from the bottom major surface of the sealing base.

In one embodiment, the combustion chamber disposed within the chimney stack is in alignment with the smoke directing lip projecting from the bottom major surface of the sealing base.

In one embodiment, one or more smoke transfer openings are formed in the sealing base. In one embodiment, each smoke transfer opening desirably has an upper end in communication with the combustion chamber and a lower end in communication with an underside of the sealing base.

In one embodiment, the cocktail smoking chimney may be made of a combustible material such as wood. In one embodiment, the cocktail smoking chimney may be made of one or more of the following types of wood: apple, hickory, pecan, maple, cherry, and oak. In one embodiment, the wood may include barrel-aged wood or mesquite infused wood.

In one embodiment, the sealing base, the chimney stack and the smoke directing lip are preferably formed from a single piece of wood and are desirably integrally connected with one another.

In one embodiment, the wood used to make the cocktail smoking chimney may include apple, hickory, pecan, maple, cherry, oak, barrel-aged wood, and/or wood infused with mesquite.

In one embodiment, the sealing base has a center and the chimney stack is aligned with the center of the sealing base.

In one embodiment, the smoke directing lip is aligned with the center of the sealing base.

In one embodiment, the upper ends of the one or more smoke transfer openings are located inside the chimney stack and the lower ends of the one or more smoke transfer openings are surrounded by the smoke directing lip.

In one embodiment, the sealing base has a central region having a first thickness and an outer perimeter having a second thickness that is less (i.e., thinner) than the first thickness.

In one embodiment, the top and bottom major surfaces of the sealing base preferably taper inwardly toward one another between the central region and the outer perimeter thereof.

In one embodiment, the sealing base may have a disc or circle shape.

In one embodiment, a screen may be disposed within the combustion chamber of the chimney stack. In one embodiment, a combustible material may be disposed within the combustion chamber of the chimney stack. The screen may support the combustible material.

In one embodiment, the combustible material may be wood chips, wood powder and/or spices.

In one embodiment, the wood chips and the wood powder may be made of one or more of the following types of wood: apple, hickory, pecan, maple, cherry, and oak. In one embodiment, the wood chips and wood powder may include barrel-aged wood or mesquite infused wood.

In one embodiment, the spices placed into the combustion chamber may include cinnamon, rosemary and/or chai.

In one embodiment, a cocktail smoking chimney for infusing smoke into a beverage desirably includes a sealing base having a central region, an outer perimeter, a top major surface that extends between the central region and the outer perimeter, and a bottom major surface that extends between the central region and the outer perimeter.

In one embodiment, a chimney stack is preferably aligned with the central region of the sealing base and projects above the top major surface of the sealing base. In one embodiment, a combustion chamber is preferably disposed within the chimney stack.

In one embodiment, a smoke directing lip is aligned with the central region of the sealing base and projects below the bottom major surface of the sealing base.

In one embodiment, the combustion chamber disposed within the chimney stack is aligned with the smoke directing lip projecting below the bottom major surface of the sealing base.

In one embodiment, the cocktail smoking chimney preferably has one or more smoke transfer openings formed in the sealing base. In one embodiment, each smoke transfer opening desirably has an upper end in fluid communication with the combustion chamber and a lower end that is surrounded by the smoke directing lip.

In one embodiment, the sealing base, the chimney stack, and the smoke directing lip are preferably made of wood, such as a single piece of wood.

In one embodiment, the central region of the sealing base preferably has a first thickness and the outer perimeter of the sealing base preferably has a second thickness that is less than the first thickness.

In one embodiment, the top and bottom major surfaces of the sealing base preferably taper inwardly toward one another between the central region of the sealing base and the outer perimeter of the sealing base.

In one embodiment, the bottom major surface of the sealing base is tapered so that when the sealing base is placed over an open upper end of a drinking glass, the sealing base will self-center on the rim of the drinking glass to ensure that smoke directed into the enclosed space between the underside of the sealing base and a top surface of a beverage poured into the drinking glass will remain within the enclosed space for infusing into the beverage and so that the smoke cannot escape via the outer perimeter of the sealing base.

In one embodiment, the sealing base preferably has a larger outer diameter than the size of the opening at the open, upper end of the drinking glass to ensure the formation of an effective seal between the underside of the sealing base and the rim of the drinking glass.

In one embodiment, when a drinking glass is inverted for being filled with smoke, the top major surface of the sealing base that surrounds the chimney stack is tapered so that when the open upper end of the drinking glass is placed over the sealing base, the drinking glass with self-center on the sealing base to ensure that smoke directed into the drinking glass will remain within the enclosed space for infusing into the beverage and so that the smoke cannot escape via a space between the rim of the drinking glass and the outer perimeter of the sealing base.

In one embodiment, when a drinking glass is inverted for being filled with smoke, the sealing base preferably has a larger outer diameter than the size of the opening of the drinking glass to ensure the formation of an effective seal between the top side of the sealing base and the rim of the inverted drinking glass.

In one embodiment, the chimney stack desirably has an open, upper end that is spaced away from the top major surface of the sealing base and a lower end that is connected with the top major surface of the sealing base.

In one embodiment, the chimney stack preferably has an outer perimeter that tapers inwardly between the open, upper end and the lower end thereof.

In one embodiment, a combustible material such as woods chips, wood powder and/or spices may be disposed within the combustion chamber of the chimney stack.

In one embodiment, a method of infusing smoke into a beverage may include pouring a beverage into a drinking glass, and placing a cocktail smoking chimney made of wood over a rim at an open upper end of the drinking glass to define a sealed space inside the drinking glass that is located between an underside of the cocktail smoking chimney and a top surface of the beverage.

In one embodiment, the cocktail smoking chimney preferably includes a sealing base having a top major surface that faces away from the drinking glass and a bottom major surface that is in contact with the rim at the open upper end of the drinking glass, a chimney stack projecting from the top major surface of the sealing base, a combustion chamber disposed within the chimney stack, and one or more smoke transfer openings formed in the sealing base that extend from the combustion chamber to an underside of the sealing base.

In one embodiment, the method may include directing a flame into the combustion chamber for burning the wood inside the combustion chamber to generate smoke that passes through the one or more smoke transfer openings and into the sealed space between the bottom major surface of the sealing base and the top major surface of the beverage.

In one embodiment, prior to directing the flame into the combustion chamber, a combustible material may be placed inside the combustion chamber.

In one embodiment, the smoke directing lip desirably has a ring shape and surrounds the lower ends of the one or more smoke transfer openings formed in the sealing base. The smoke directing lip may direct the smoke toward the top surface of the beverage so as to minimize the likelihood of the smoke curling outwardly over the bottom major surface of the sealing base toward the outer perimeter of the sealing base where it could escape from the sealed space rather than be infused into the beverage.

In one embodiment, the sealing base preferably has a central region having a first thickness and an outer perimeter having a second thickness that is less than the first thickness.

In one embodiment, the top and bottom major surfaces of the sealing base preferably taper inwardly toward one another between the central region and the outer perimeter of the sealing base.

In one embodiment, the chimney stack and the smoke directing lip are desirably aligned with the central region of the sealing base.

These and other preferred embodiments of the present patent application will be described in more detail herein.

DETAILED DESCRIPTION OF PREFERRED EMBODIMENTS

Figure 1A:
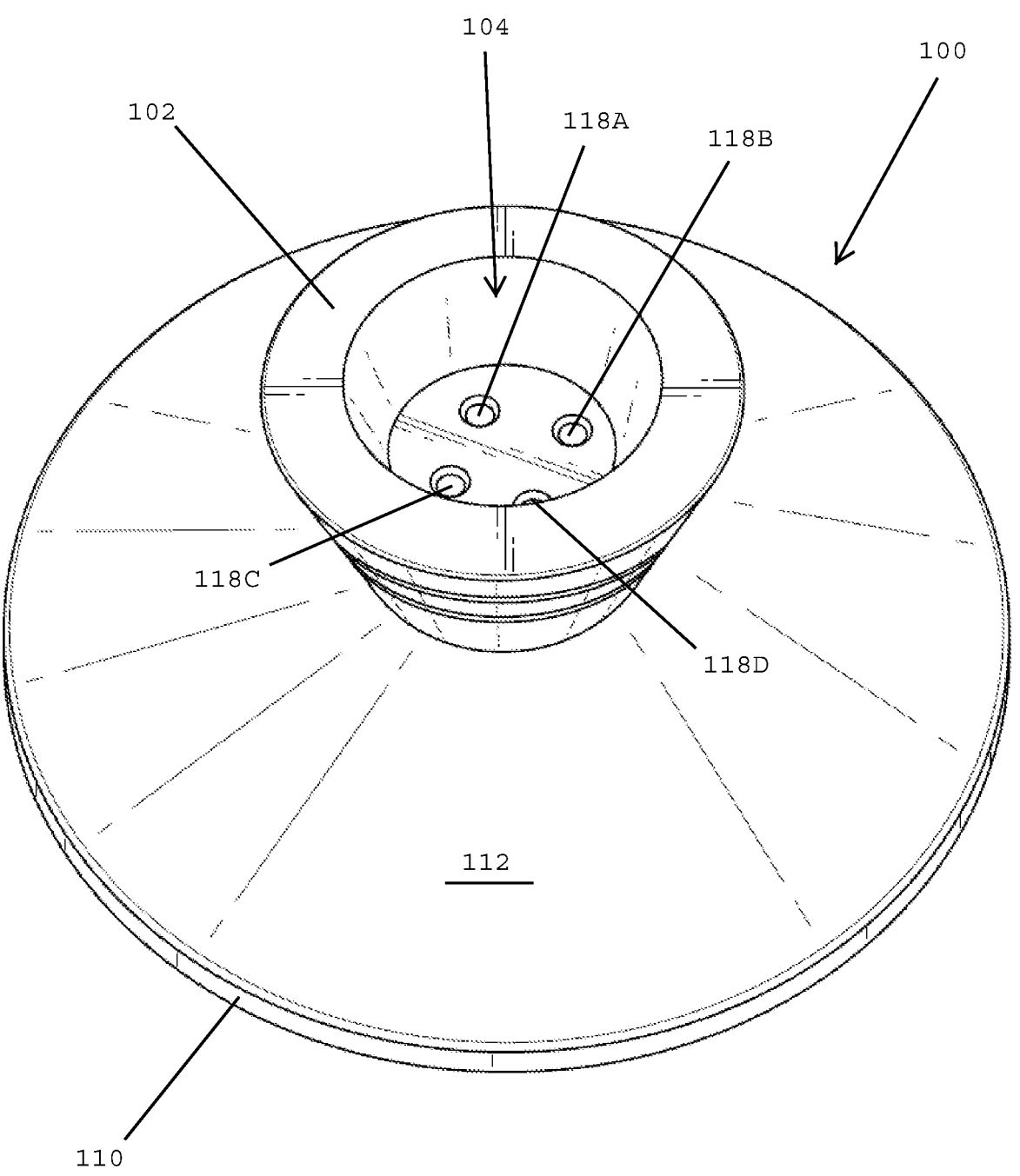
FIG. 1A is a perspective view of a top side of a cocktail smoking chimney, in accordance with one embodiment of the present patent application.
Figure 1B:
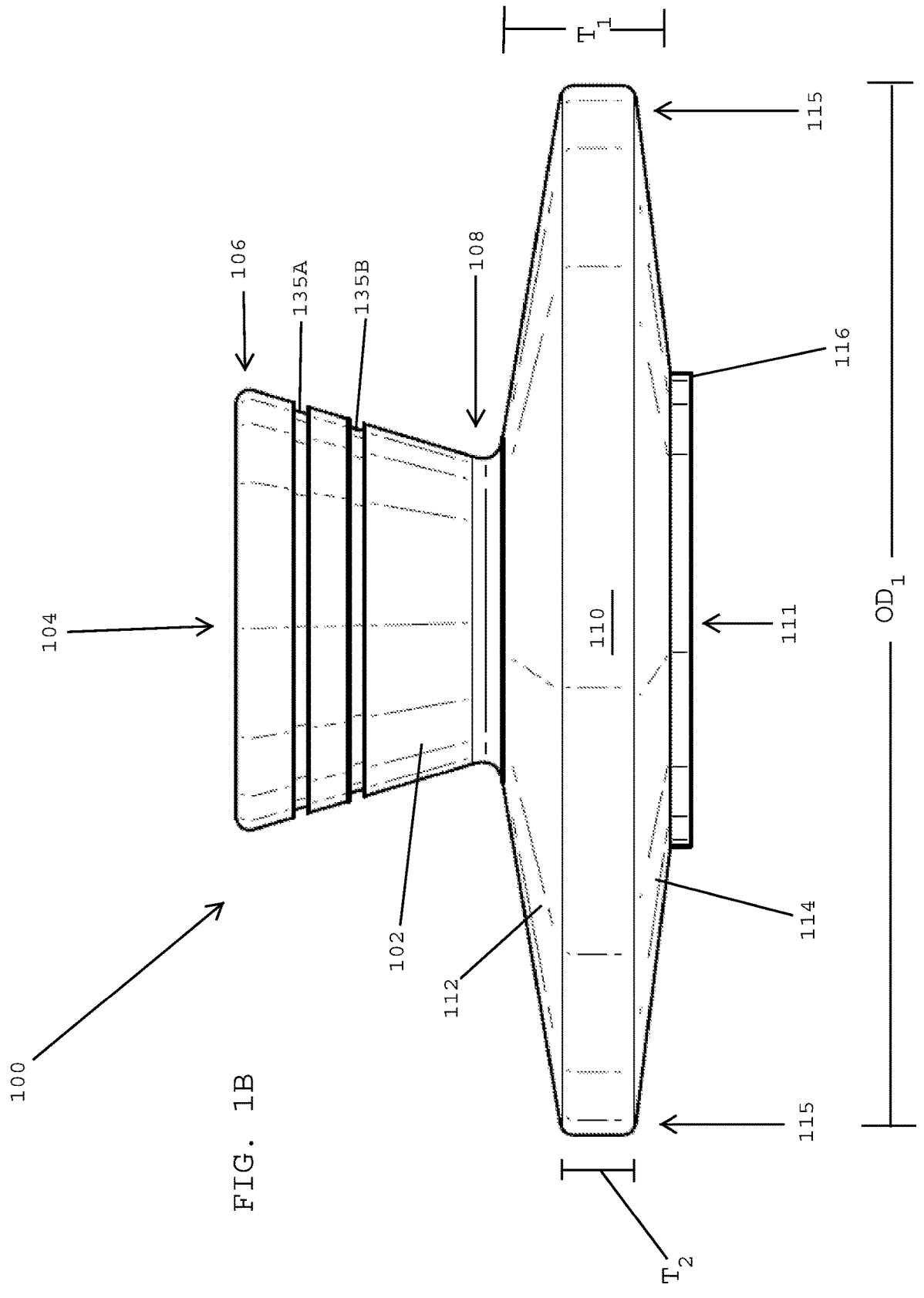
FIG. 1B is a side elevation view of the cocktail smoking chimney shown in FIG. 1A.

Referring to FIGS. 1A and 1B, in one embodiment, a cocktail smoking chimney 100 is preferably used for generating smoke that may be infused into a cocktail or beverage. In one embodiment, the cocktail smoking chimney 100 preferably includes a chimney stack 102 having a combustion chamber 104 that may be configured to receive combustible items such as wood chips (e.g., cocktail smoking chips), wood powder (e.g., cocktail smoking powder), and/or spices (e.g., cinnamon).

In one embodiment, the cocktail smoking chimney 100 is made of a combustible material such as wood. In one embodiment, the cocktail smoking chimney 100 may be made of one or more of the following wood types: apple, hickory, pecan, maple, cherry, and oak. In one embodiment, the wood may include barrel-aged wood or mesquite infused wood.

In one embodiment, the chimney stack 102 preferably has an upper end 106 and a lower end 108, whereby the chimney stack tapers inwardly between the upper end 106 and the lower end 108. In one embodiment, the upper end 106 of the chimney stack 102 may be open for enabling the wood chips, wood powder and/or spices to be placed (e.g., packed) into the chimney stack 102.

In one embodiment, the cocktail smoking chimney 100 preferably includes a sealing base 110 having a top major surface 112 that faces toward the upper end 106 of the smoking chimney 102, and a bottom major surface 114 that faces away from the upper end 106 of the smoking chimney 102. In one embodiment, the top major surface 112 preferably defines a top side of the sealing base 110 and the bottom major surface 114 preferably defines a bottom side of the sealing base.

In one embodiment, the top major surface 112 of the sealing base 110 is tapered and the bottom major surface 114 of the sealing base is tapered so that a central region 111 of the sealing base is thicker than an outer perimeter region 115 of the sealing base.

In one embodiment, the top major surface 112 of the sealing base 110 is tapered so that an inverted drinking glass will self-center over the sealing base 110 when the inverted drinking glass is placed over the chimney stack 102, whereby a rim at an open, upper end of the drinking glass engages the top major surface 112 of the sealing base 110.

In one embodiment, the bottom major surface 114 of the sealing base 110 is tapered so that the cocktail smoking chimney 100 and the sealing base 110 will self-center over a rim at an open, upper end of a drinking glass when the sealing base 110 covers the open, upper end of the drinking glass.

Referring to FIG. 1B, in one embodiment, the cocktail smoking chimney 100 preferably includes a smoke directing lip 116 that projects from the bottom major surface 114 of the sealing base 110 for directing smoke into the open, upper end of a drinking glass (e.g., a cocktail glass), while preventing the smoke from curling up the bottom major surface 114 of the sealing base 110 and flowing toward the outer perimeter region 115 of the sealing base 110.

In one embodiment, the sealing base 110 preferably has an outer diameter $OD_1$ that is sufficiently large to cover the opening of a drinking glass when the sealing base is placed over the drinking glass opening. In one embodiment, the outer diameter $OD_1$ of the sealing base 110 may be about 4-10 inches and more preferably about 5-8 inches.

In one embodiment, the sealing base 110 preferably has a central region having a first thickness T1 and the outer perimeter 115 has a second thickness T2 that is less than the first thickness T1. In one embodiment, the top and bottom major surfaces 112, 114 of the sealing base 110 taper inwardly toward one another between the central region 111 of the sealing base 110 and the outer perimeter 115 of the sealing base 110.

In one embodiment, when the cocktail smoking chimney 100 is placed atop a rim at an open, upper end of a drinking glass, the tapered bottom major surface 114 of the sealing base 110 preferably self-centers the cocktail smoking chimney 100 over the opening of the drinking glass to facilitate the formation of an effective seal between the underside of the sealing base 110 and the rim of the drinking glass.

In another embodiment, when a drinking glass is inverted and placed over the top side of the cocktail smoking chimney 100, the tapered top major surface 112 preferably self-centers the drinking glass over the chimney stack 102 to facilitate the formation of an effective seal between the rim of the inverted drinking glass and the top side of the sealing base 110.

In one embodiment, the outer surface of the chimney stack 102 may include two annular rings 135A, 135B that extend around the outer perimeter of the chimney stack. In one embodiment, the annular rings 135A, 135B may be grooves that are formed in the outer surface of the chimney stack 102 using wood-working tools. In one embodiment, the annular rings 135A, 135B may be parallel to one another. In one embodiment, a small point chisel may be used to form small annular depressions in the outer surface of the chimney stack, and a wire may be used to burn the annular rings 135A, 135B (e.g., grooves). In one embodiment, the annular rings 135A, 135B are added to the chimney stack for aesthetic reasons to improve the ornamental appearance of the cocktail smoking chimney 100.

Figure 1C:
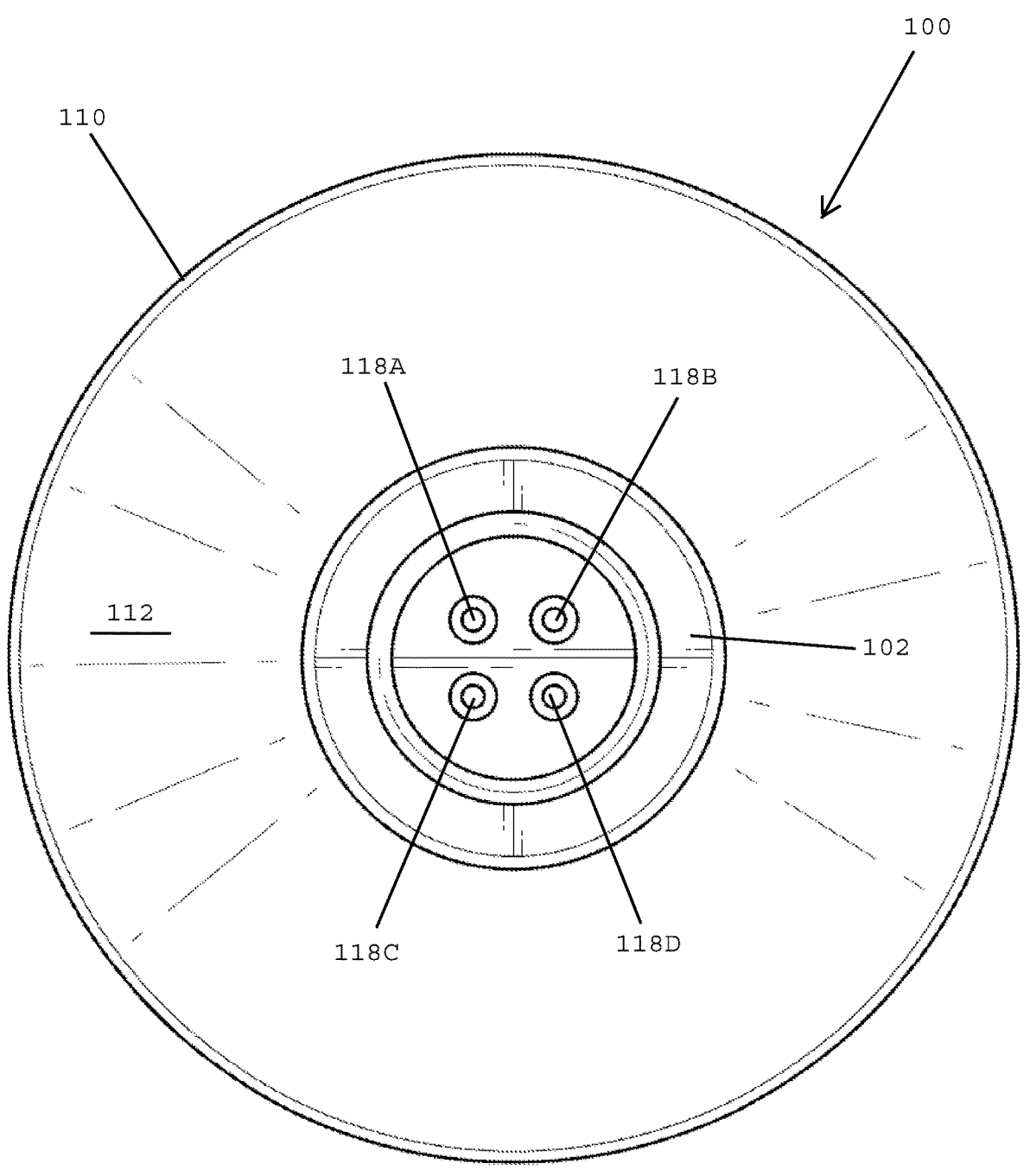
FIG. 1C is a top plan view of the cocktail smoking chimney shown in FIGS. 1A and 1B.
Figure 1D:
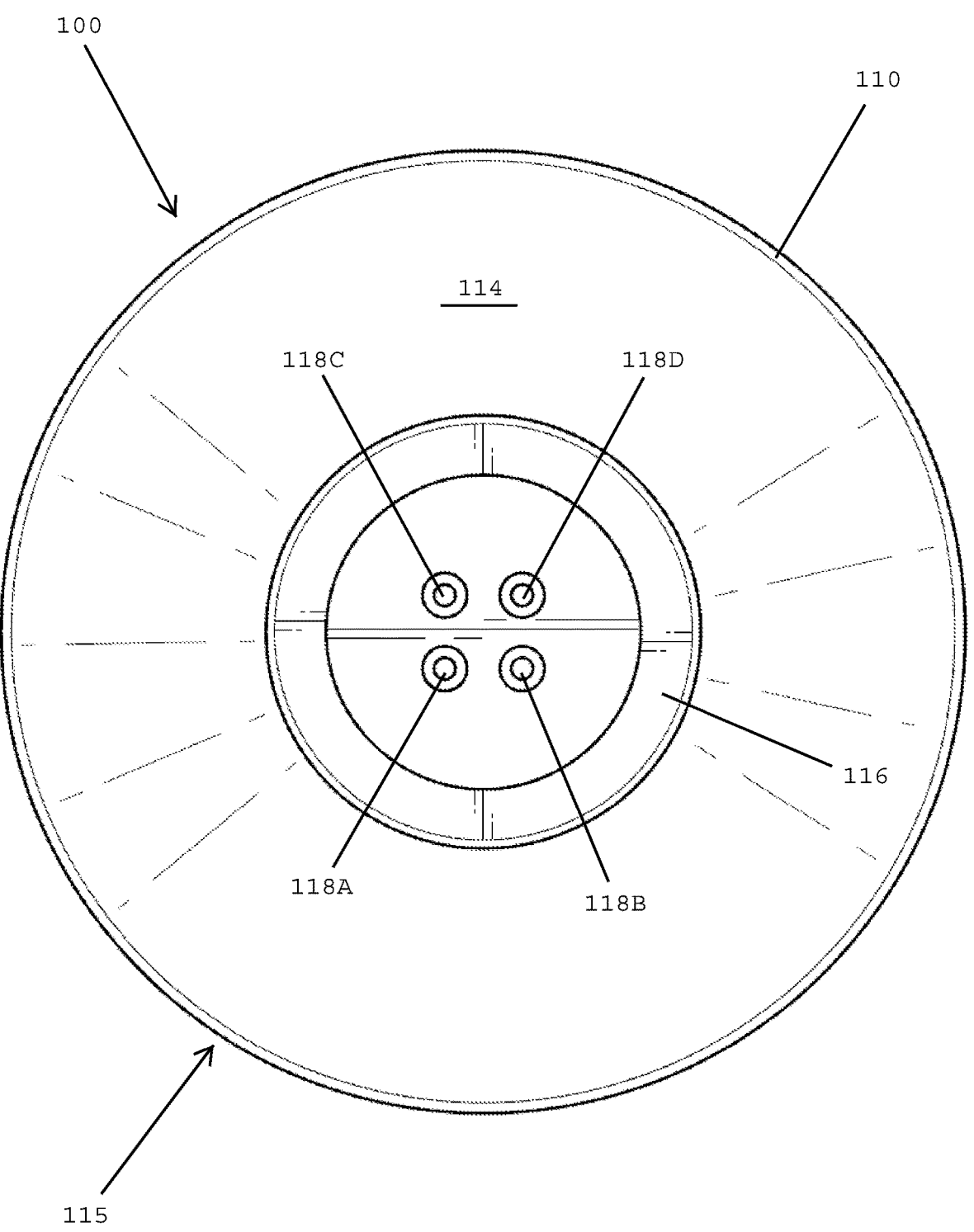
FIG. 1D is a bottom view of the cocktail smoking chimney shown in FIGS. 1A-1C.

Referring to FIGS. 1A, 1C, and 1D, in one embodiment, the cocktail smoking chimney 100 preferably includes a plurality of smoke transfer openings 118A-118D that are located inside the combustion chamber 104 of the chimney stack 102 and that extend completely through the thickness of the sealing base. In one embodiment, the smoke transfer openings 118A-118D are preferably open between the top major surface 112 of the sealing base 110 to the bottom major surface 114 of the sealing base 110.

In one embodiment, the chimney stack 102 is preferably located in a center of the sealing base 110. The chimney stack 102 preferably projects above the top major surface 112 of the sealing base 110. The smoke transfer openings 118A-118D desirably provide fluid communication between the combustion chamber 104 located on a top side of the sealing base 110 and the underside of the sealing base so that smoke may pass through the smoke transfer openings from the top side to the bottom side of the sealing base.

Referring to FIGS. 1B and 1D, in one embodiment, the smoking directing lip 116 projects downwardly from the bottom major surface 114 of the sealing base 110 and desirably surrounds the smoking transfer openings 118A-118D. The smoke directing lip 116 preferably directs smoke that passes through the smoke transfer opening 118A-118D toward a top surface of a liquid (e.g., a cocktail; an alcoholic beverage) that has been poured into a cocktail glass, thereby preventing the smoke from curling up or flowing in an outer direction toward the outer periphery 115 of the sealing base 110.

Figure 1E:
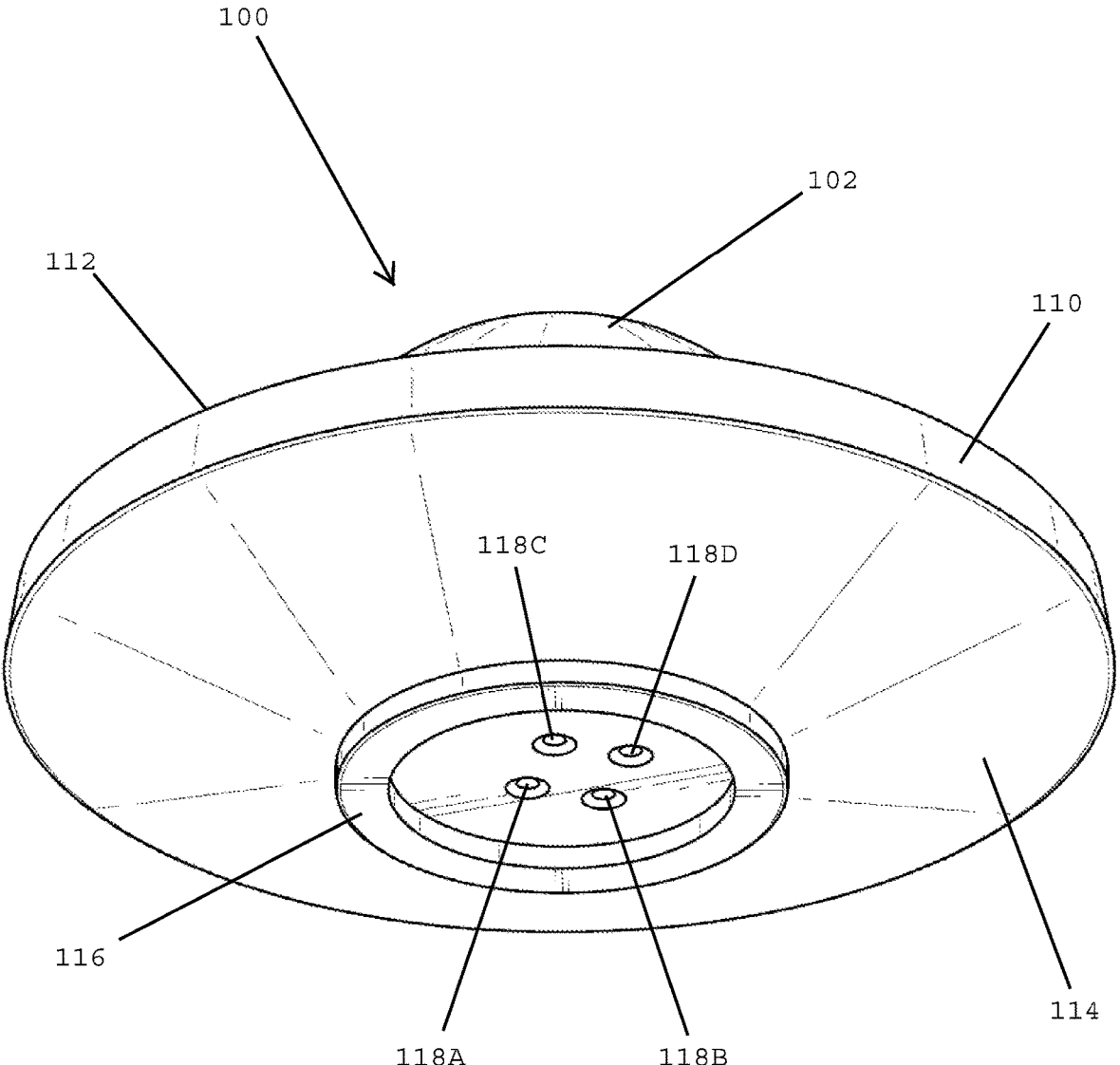
FIG. 1E is a perspective view of an underside of the cocktail smoking chimney shown in FIGS. 1A-1D.

Referring to FIG. 1E, in one embodiment, the chimney stack 102 preferably projects upwardly from a top major surface 112 (FIG. 1B) of the sealing base 110. The smoke directing lip 116 preferably projects below the bottom major surface 114 of the sealing base 110. The smoke directing lip 116 preferably surrounds the smoke transfer openings 118A-118D, which extend from the combustion chamber 104 of the chimney stack 102 (FIG. 1A) to the underside of the sealing base 110 for allowing smoke to pass through the sealing base. Referring to FIGS. 1A and 1D, in one embodiment, any smoke that is present and/or generated within the combustion chamber 104 of the chimney stack 102 of the cocktail smoking chimney 100 may pass through the smoke transfer openings 118A-118D to reach the underside of the sealing base 110 for being directed into an open, upper end of a drinking glass that is positioned below the bottom major surface 114 of the sealing base 110.

Referring to FIGS. 1A-1E, in one embodiment, the cocktail smoking chimney 100 is preferably constructed from wood that is cut down to size. In one embodiment, the cocktail smoking chimney 100 may be formed using a lathe.

In one embodiment, a wood block may be rotated on a lathe. As the wood block is rotated on the lathe, chisels and wood-working tools may be used for shaping the wood block to form the various elements of the cocktail smoking chimney 100 including the chimney stack 102, the combustion chamber 104, the sealing base 110, and the smoke directing lip 116. A drill, such as a drill press, may be used for forming the smoke transfer openings 118A-118D that extend through the sealing base 110 for providing communication between the combustion chamber 104 and the underside of the sealing base.

In one embodiment, the chimney stack 102, the combustion chamber 104, the sealing base 110, and the smoke directing lip 116 are formed from a single piece of wood, whereby all of the above-noted elements are integrally connected with one another.

Although the embodiment of FIGS. 1A-1E shows four (4) smoke transfer openings 118A-118D, other embodiments may have fewer smoke transfer openings (e.g., three) or more smoke transfer openings (e.g., eight). In one embodiment, a cocktail smoking chimney may have 2-25 smoke transfer openings. In one embodiment, instead of drilling holes to form the smoke transfer openings, the sealing base may have a central opening that is disposed between the top and bottom major surfaces of the sealing base 110. A screen may be secured within the central opening for supporting combustible material (e.g., wood powder) within the combustion chamber 104 of the chimney stack 102 of the cocktail smoking chimney 100.

In one embodiment, a cocktail smoking chimney may be formed from a wood block using a router system or router machine such as a three-axis or five-axis router system sold by Hendrick Manufacturing of Salem, MA; https://www.hendrickmanufacturing.com/cnc-routers/.

Figures 2A, 2B, 2C, 2D:
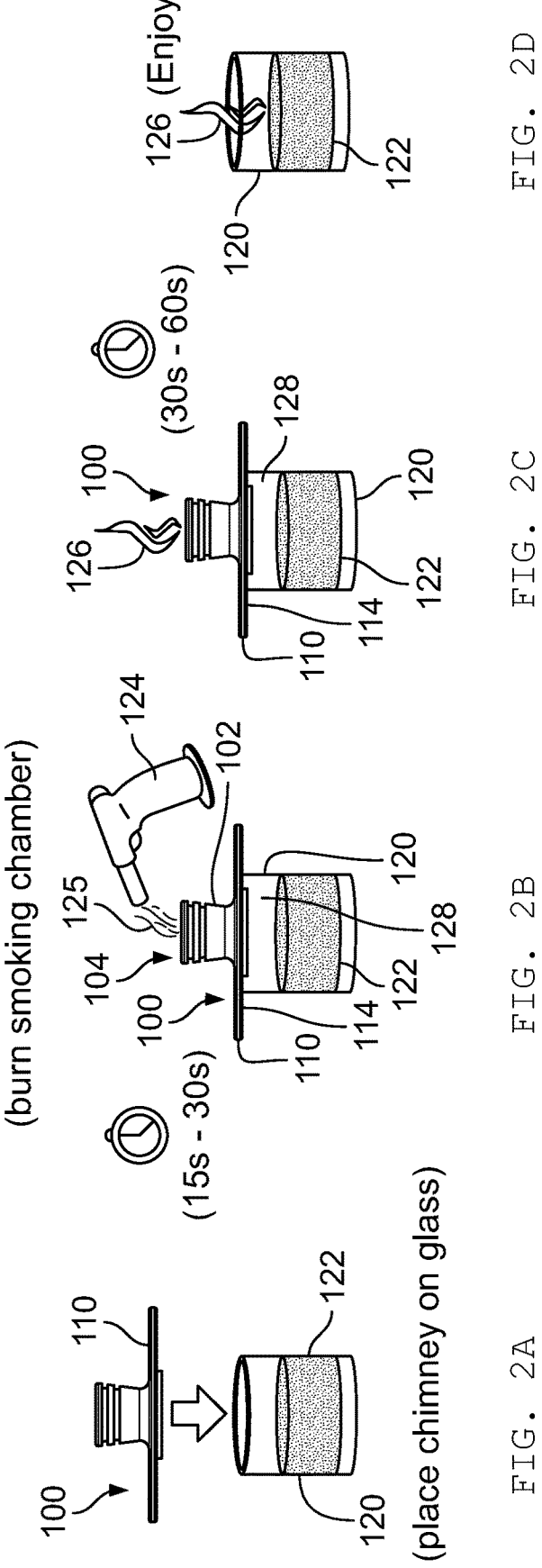
FIG. 2A is a schematic view of a first step of a method of infusing smoke into a cocktail, in accordance with one embodiment of the present patent application.
FIG. 2B is a schematic view of a second step of a method of infusing smoke into a cocktail, in accordance with one embodiment of the present patent application.
FIG. 2C is a schematic view of a third step of a method of infusing smoke into a cocktail, in accordance with one embodiment of the present patent application.
FIG. 2D is a schematic view of a fourth step of a method of infusing smoke into a cocktail, in accordance with one embodiment of the present patent application.

Referring to FIG. 2A, in one embodiment, the cocktail smoking chimney 100 shown in FIGS. 1A-1E may be positioned over an open, upper end of a drinking glass 120 (e.g., a cocktail glass), which contains a liquid 122 (e.g., a cocktail; an alcoholic beverage) that has been poured in the drinking glass 120.

Referring to FIG. 2B, in one embodiment, the sealing base 110 of the cocktail smoking chimney 100 preferably seals the open, upper end of the drinking glass 120. A butane torch 124 is preferably activated for directing a flame 125 into the combustion chamber 104 of the chimney stack 102 to burn a section of the cocktail smoking chimney 100 that is located inside the combustion chamber 104. In one embodiment, the flame 125 may be directed into the combustion chamber 104 for up to 60 seconds and more preferably about 15-30 seconds. In one embodiment, as the woods inside the combustion chamber 14 burns, smoke is generated. The generated smoke preferably flows through the smoke transfer openings 118A-118D (FIGS. 1C-1E) and into a sealed space 128 that is located between the bottom major surface 114 of the sealing base 110 and the beverage 122 that has been poured into the drinking glass 120 for infusing the smoke into the beverage 122.

Referring to FIG. 2C, in one embodiment, after the smoke 126 has been generated (e.g., by burning a section of the cocktail smoking chimney 100), the smoke preferably passes through the smoke transfer openings 118A-118D (FIG. 1E) at the underside of the sealing base 110 and into the sealed space 128 that is located between the bottom major surface 114 of the sealing base 110 and the top surface of the beverage 122 that has been previously poured into the drinking glass 120. The smoke 126 preferably passes through the smoke transfer openings of the cocktail smoking chimney for infusing the beverage 122 with the smoke. In one embodiment, when smoking, the cocktail smoking chimney may be left atop the drinking glass for up to two minutes and more preferably about 30-60 seconds.

Referring to FIG. 2D, in one embodiment, after the smoke 126 has been infused into the beverage 122 disposed within the drinking glass 120, the cocktail smoking chimney 100 (FIG. 2C) may be removed so that the smoke-infused beverage may be consumed by an individual.

Figure 3:
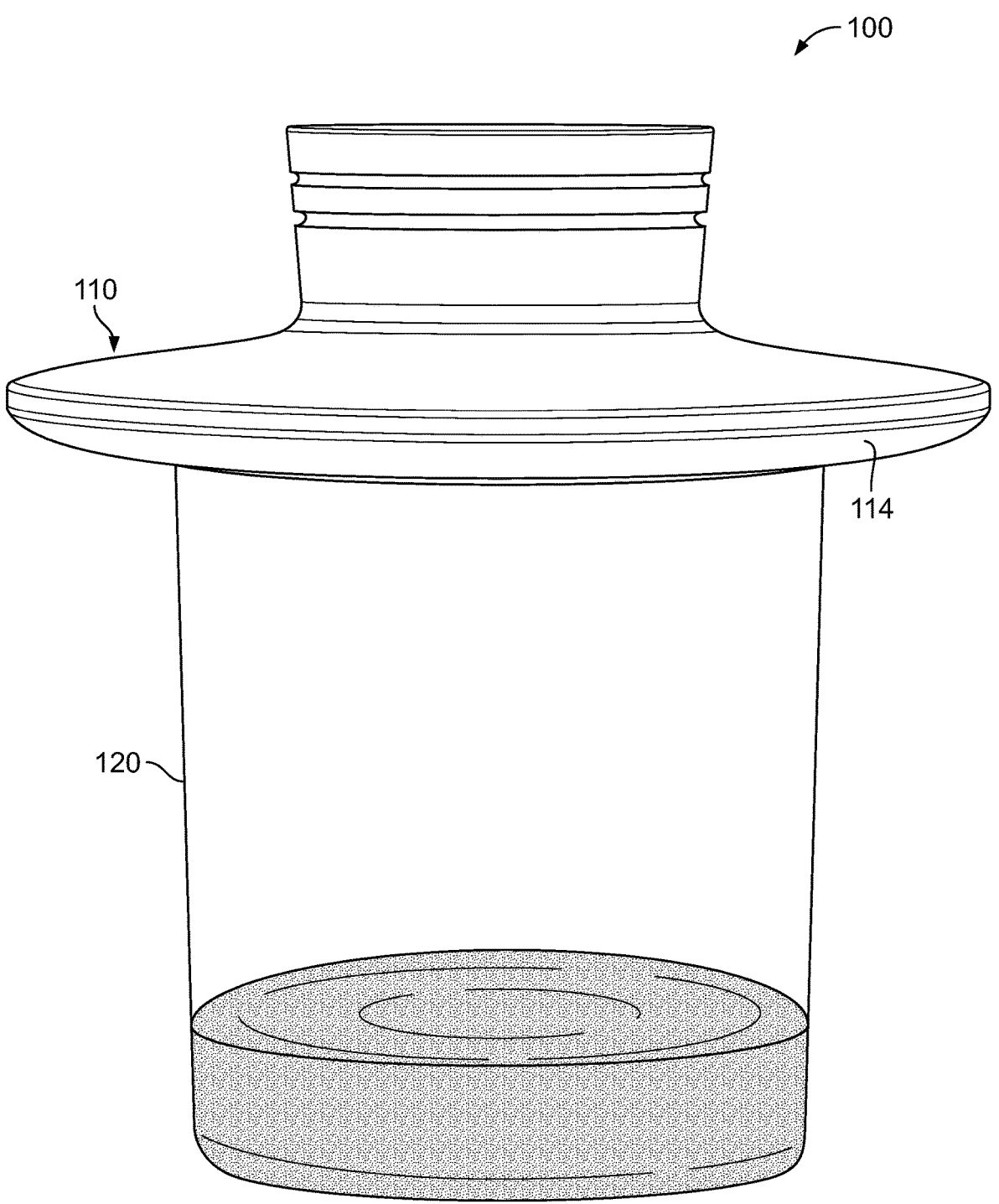
FIG. 3 is a side view of a cocktail smoking chimney covering an open, upper end of a glass, in accordance with one embodiment of the present patent application.

Referring to FIG. 3, in one embodiment, the cocktail smoking chimney 100 is placed over an open, upper end of a drinking glass 120 so that the opening of the cocktail glass 120 is covered and sealed by the bottom major surface 114 of the sealing base 110 of the cocktail smoking chimney 100. Although not shown in FIG. 3, in one embodiment, before the cocktail smoking chimney is placed atop the open, upper end of the drinking glass 120, a liquid (e.g., a cocktail; an alcoholic beverage) may be poured into the drinking glass.

Figure 4:
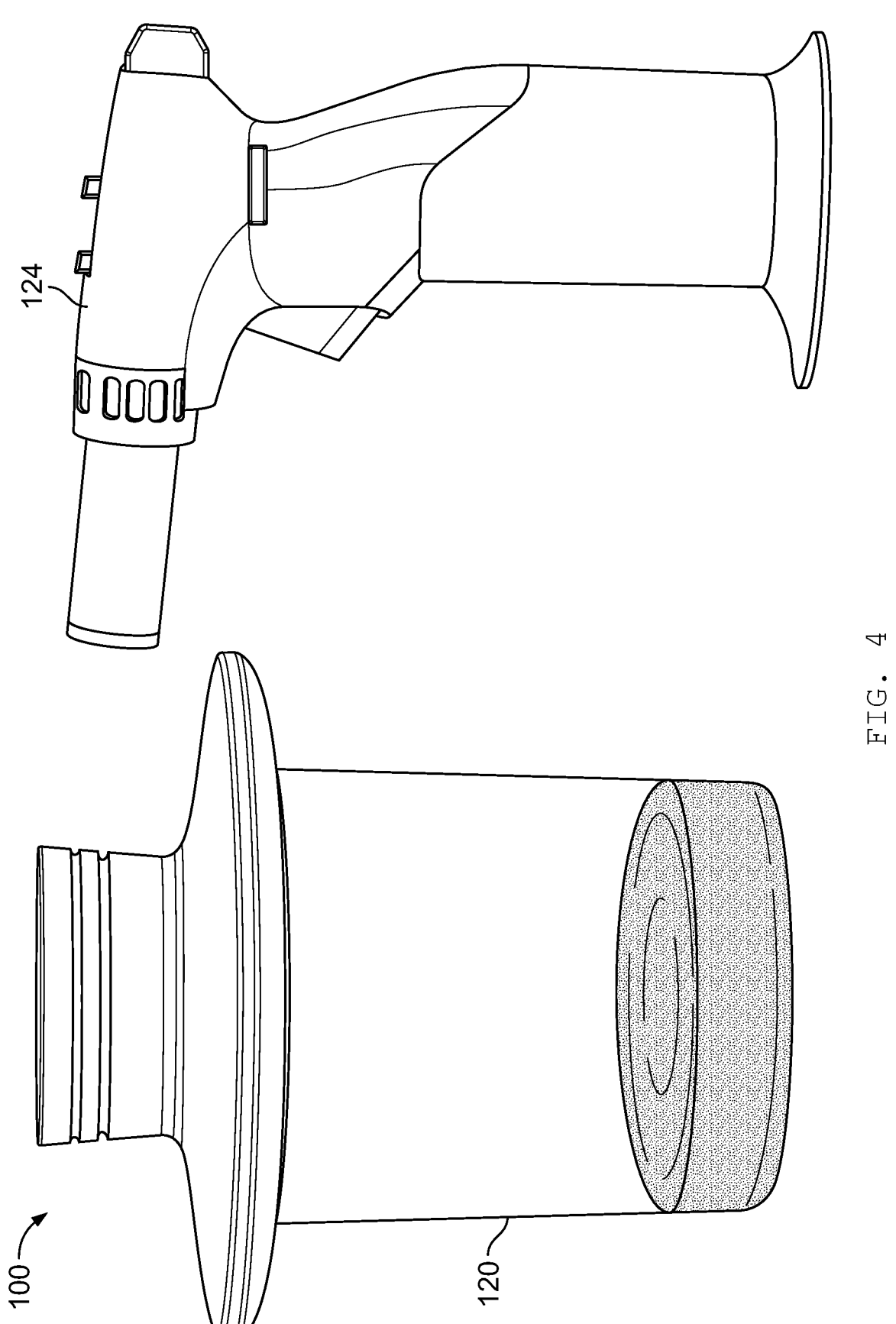
FIG. 4 is a side view of a butane torch positioned next to the cocktail smoking chimney and the glass shown in FIG. 3.

Referring to FIG. 4, in one embodiment, the butane torch 124 is positioned adjacent the cocktail glass 120 and the cocktail smoking chimney 100 that has been positioned atop the open, upper end of the drinking glass 120 for sealing the top of the drinking glass.

Figure 5:
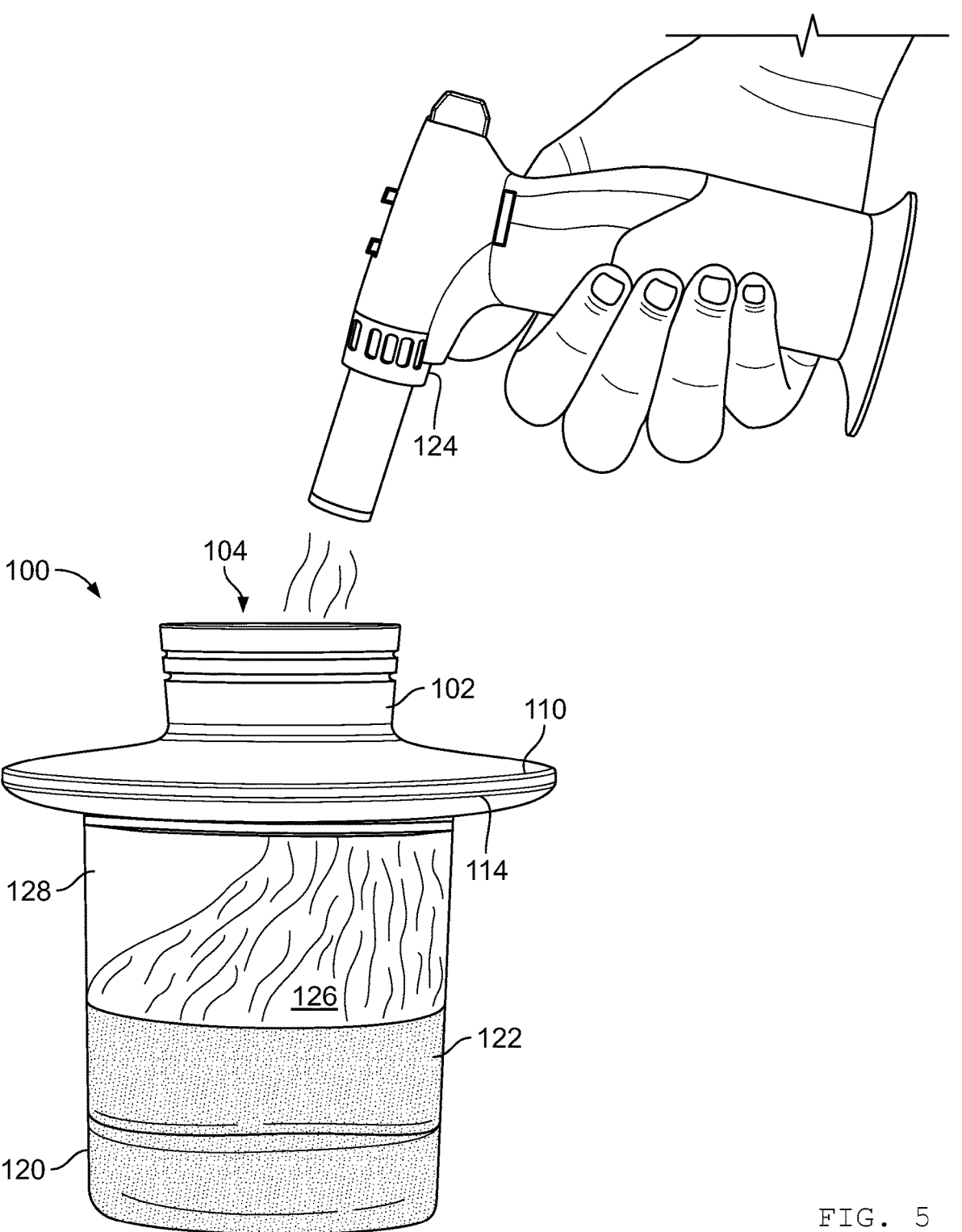
FIG. 5 shows the butane torch of FIG. 4 being used to direct a flame into a combustion chamber of the cocktail smoking chimney of FIG. 4 for generating smoke inside the glass of FIG. 4.

Referring to FIG. 5, in one embodiment, the butane lighter 124 is activated for producing a flame that may be directed into the combustion chamber 104 of the chimney stack 102 of the cocktail smoking chimney 100. The flame (not shown) that is directed into the combustion chamber 104 desirably burns some of the material of the cocktail smoking chimney 100 to generate smoke that passes through the smoke transfer openings 118A-118D (FIG. 1C) and into the sealed space 128 that extends between the bottom major surface 114 of the sealing base 110 and the top surface of the beverage 122 that was previously poured into the drinking glass 120. Burning a section of the material that comprises the cocktail smoking chimney 100 desirably generates smoke that passes through the smoke transfer openings and into the sealed space 128 for infusing the smoke into the beverage 122.

Figure 6:
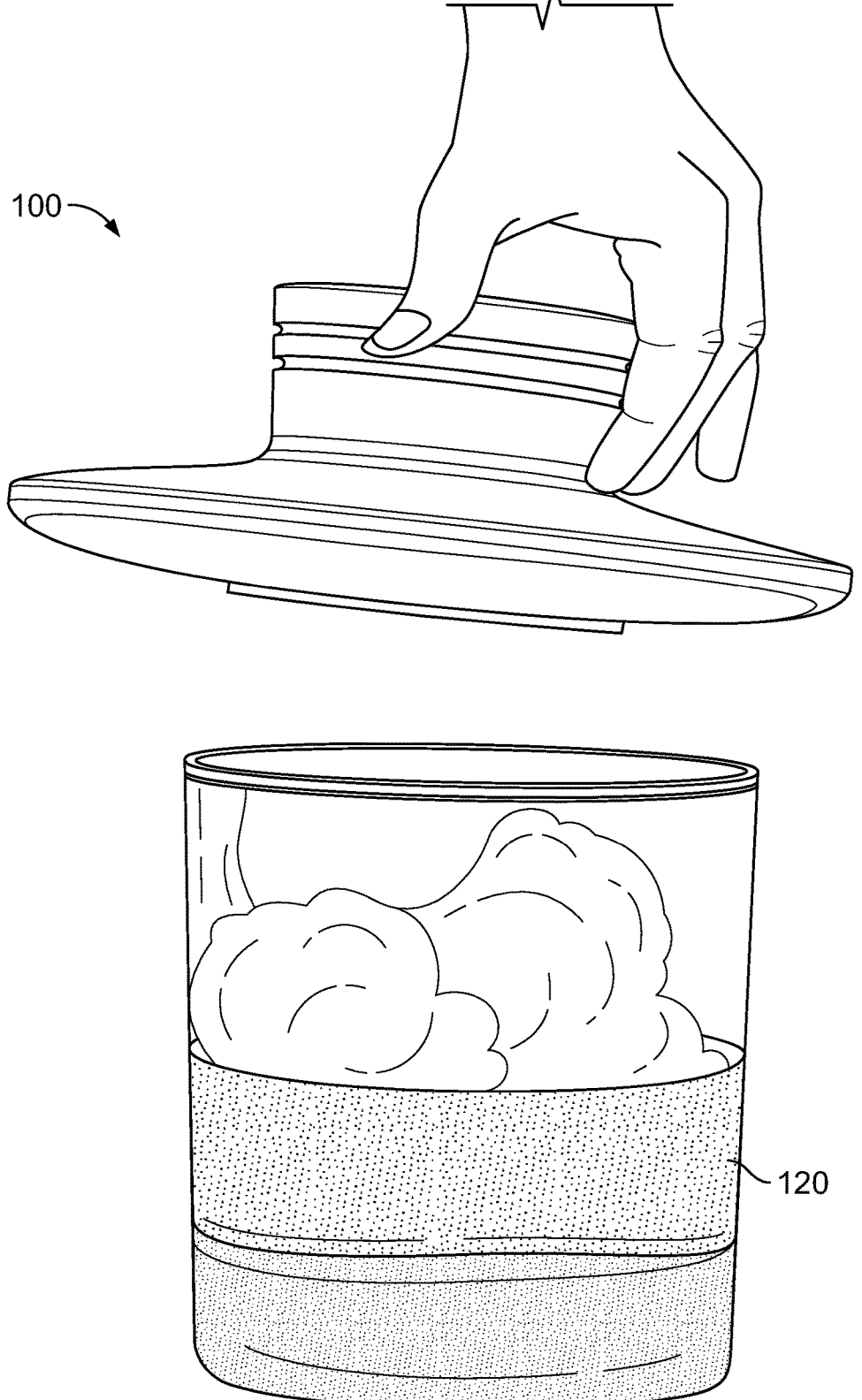
FIG. 6 shows the cocktail smoking chimney being removed from covering the open, upper end of the glass shown in FIG. 5.

Referring to FIG. 6, in one embodiment, after the smoke has been forced through the smoking transfer openings of the cocktail smoking chimney 100, the cocktail smoking chimney may be removed from the open, upper end of the drinking glass 120 to provide a smoke-infused cocktail that may be enjoyed by an individual.

Figure 7:
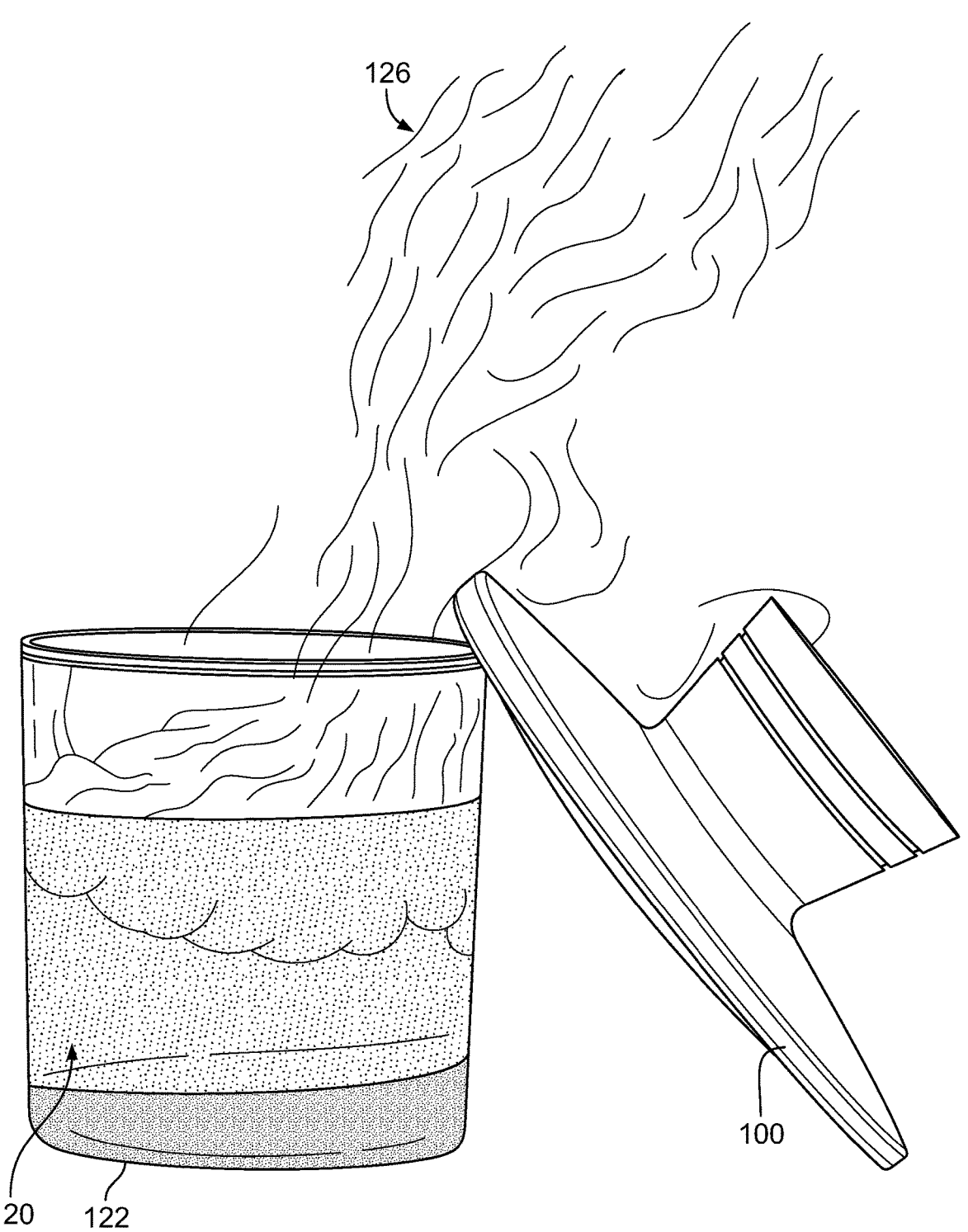
FIG. 7 shows a cocktail with infused smoke, in accordance with one embodiment of the present patent application.

Referring to FIG. 7, in one embodiment, after the smoke 126 has been infused into the beverage 122, the cocktail smoking chimney 100 may be lifted away from the open, upper end of the drinking glass 120, whereupon the smoke 126 that has been infused into the drinking glass 120 and the beverage 122 may waif above the drinking glass 122 for creating an anesthetically pleasing appearance.

In one embodiment, smoke may be infused into a drinking glass (and a cocktail) by inverting the drinking glass and placing it atop a top major surfaced of a sealing base of a cocktail smoking chimney, whereupon the drinking glass covers a chimney stack of the cocktail smoking chimney.

Figures 8A, 8B, 8C, 8D, 8E, 8F:
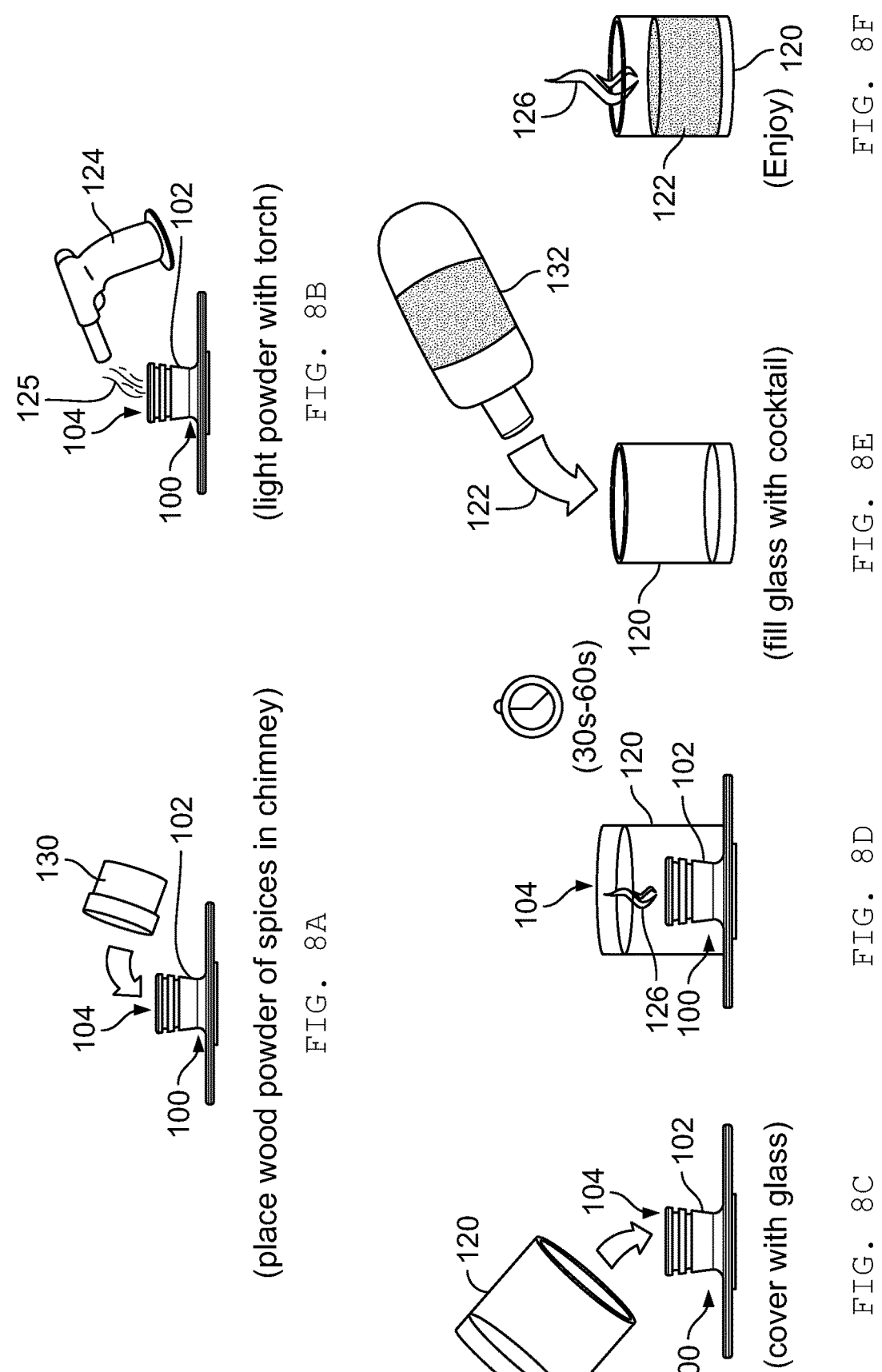
FIG. 8A is a schematic view of a first step of a method of infusing a cocktail with smoke, in accordance with one embodiment of the present patent application.
FIG. 8B is a schematic view of a second step of a method of infusing a cocktail with smoke, in accordance with one embodiment of the present patent application.
FIG. 8C is a schematic view of a third step of a method of infusing a cocktail with smoke, in accordance with one embodiment of the present patent application.
FIG. 8D is a schematic view of a fourth step of a method of infusing a cocktail with smoke, in accordance with one embodiment of the present patent application.
FIG. 8E is a schematic view of a fifth step of a method of infusing a cocktail with smoke, in accordance with one embodiment of the present patent application.
FIG. 8F is a schematic view of a sixth step of a method of infusing a cocktail with smoke, in accordance with one embodiment of present patent application.

Referring to FIG. 8A, in one embodiment, a smoke-infused cocktail may be made by positioning a cocktail smoking chimney 100 atop a surface. In one embodiment, wood chips, wood powder, and/or spices may be placed (e.g., packed) into the combustion chamber 104 of the chimney stack 102. In one embodiment, the wood chips, wood powder and/or spices may be held within a container 130. In one embodiment, the container 130 may have a top lid that may be removed for exposing the wood chips, wood powder and/or spices. In one embodiment, the container 130 may be tilted for dispensing the wood chips, wood powder and/or spices from the container and into the combustion chamber 104 of the chimney stack 102.

Referring to FIG. 8B, in one embodiment, a butane torch 124 may be utilized for burning the combustible material that has been placed into the combustion chamber 104 of the chimney stack 102 of the cocktail smoking chimney 100. In one embodiment, the butane torch 124 is activated for generating a flame 125 that is directed into the combustion chamber 104 for igniting the combustible material within the combustion chamber 104 of the chimney stack 102.

Referring to FIG. 8C, in one embodiment, after the combustible material within the combustion chamber 104 has been ignited to generate smoke, a drinking glass 120 (e.g., a cocktail glass) may be inverted for being positioned over the chimney stack 102 of the cocktail smoking chimney 100.

FIG. 8D illustrates the inverted drinking glass 120 positioned over the chimney stack 102 of the cocktail smoking chimney 100. The smoke 126 generated within the combustion chamber 104 of the chimney stack 102 preferably flows into the inverted drinking glass 120. In one embodiment, the smoke 126 is allowed to fill the inside of the inverted drinking glass 120 for up to two minutes and more preferably about 30-60 seconds.

Referring to FIG. 8E, in one embodiment, after the smoke 126 (FIG. 8D) has filled the inside of the drinking glass 120, a beverage 122 (e.g., a cocktail) contained in a bottle 132 may be poured into the open, upper end of the drinking glass for at least partially filling the drinking glass with the beverage 122.

FIG. 8F shows the smoke-infused beverage 122 after it has been poured into the drinking glass 120. The smoke 126 that has been previously directed into the cocktail glass 120 preferably infuses into the beverage 122. The smoke, which is desirably infused into the beverage, may waif above the open, upper end of the drinking glass 120 to provide an aesthetically pleasing appearance and a desirably smoky aroma.

Figure 9:
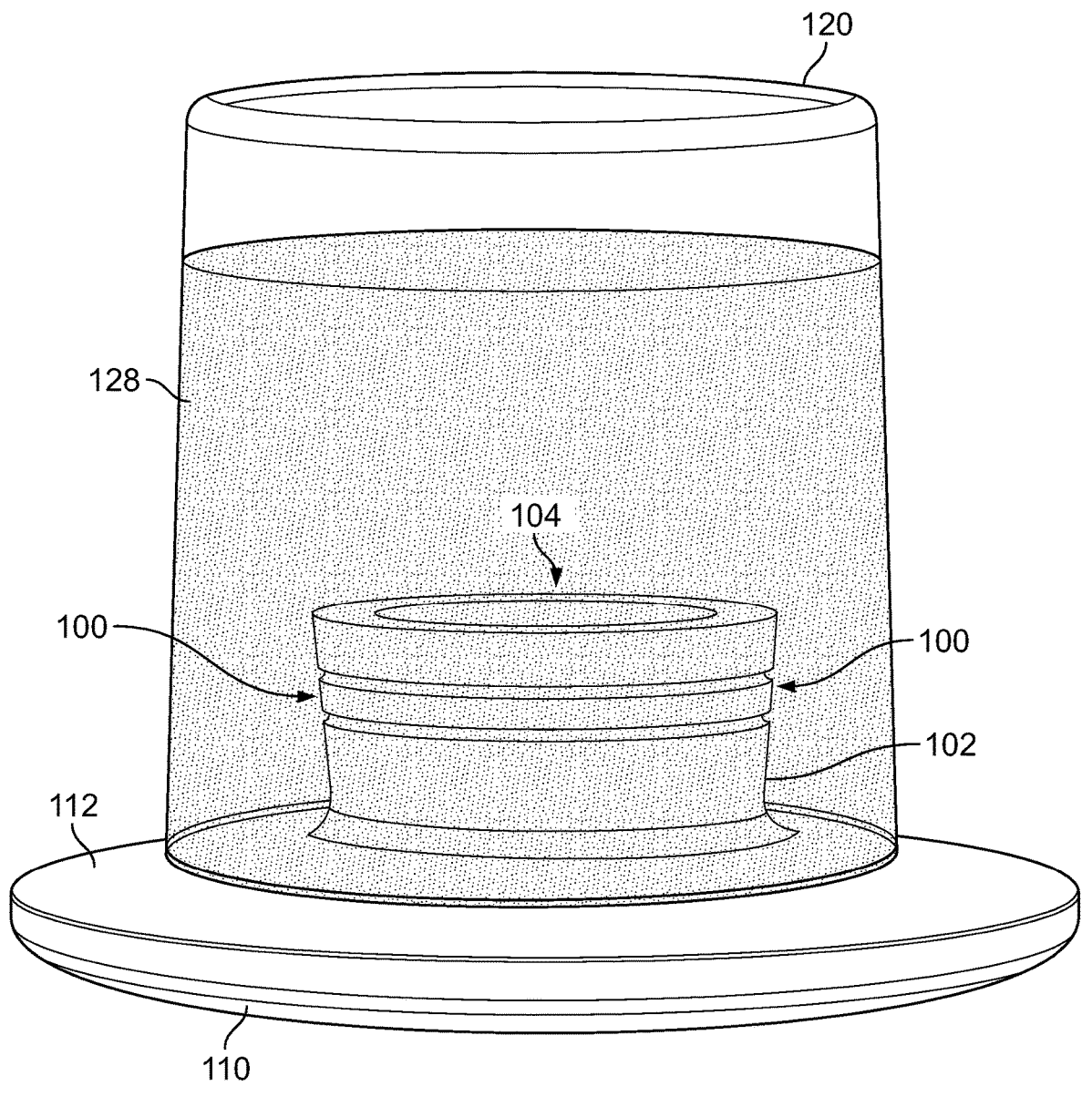
FIG. 9 shows a cocktail smoking chimney with a glass inverted and covering a chimney stack of the cocktail smoking chimney, in accordance with one embodiment of the present patent application.

Referring to FIG. 9, in one embodiment, a drinking glass 120 (e.g., a cocktail glass) is inverted and the open, upper end of the drinking glass 120 is placed over a top major surface 112 of a sealing base 110 of a cocktail smoking chimney 100. In one embodiment, the top major surface 112 may be tapered, which facilitates self-centering of the drinking glass 120 over the sealing base 110 of the cocktail smoking chimney 100. Combustible material (e.g., wood chips; wood powder; spices) may be positioned (e.g., packed) within the combustion chamber 104 of the chimney stack 102 of the cocktail smoking chimney 100. The combustible material may be burned for generating smoke that fills the interior 128 of the inverted drinking glass 120. After the interior sealed space 128 of the drinking glass 120 has been filled with the smoke (e.g., after about 30-60 seconds) generated within the combustion chamber 104 of the chimney stack 102, the drinking glass 120 may be lifted away from the cocktail smoking chimney 100, and oriented into upright configuration so that a beverage may be poured into the drinking glass. The smoke that has been generated inside the drinking glass will preferably infuse into the beverage for providing a smoke-infused beverage (e.g., a smoke infused cocktail; a smoke infused alcoholic beverage).

Figure 10A:
FIG. 10A shows containers that are designed for holding cocktail smoking powder that is burned for generating smoke, in accordance with one embodiment of the present patent application.

Referring to FIG. 10A, in one embodiment, a system for infusing smoke into a beverage may include containers 130 that hold combustible material that may be burned inside the combustion chamber of the chimney stack of the cocktail smoking chimney disclosed herein for generating smoke that may be infused into beverages.

Figure 10B:
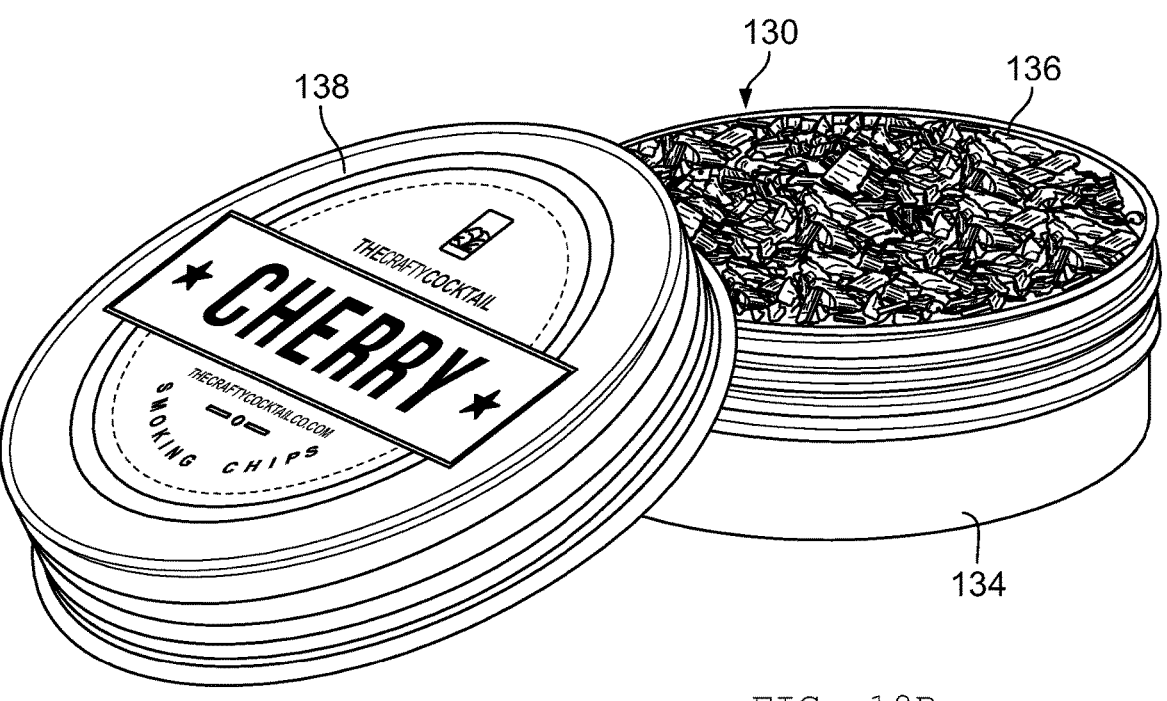
FIG. 10B shows one of the containers of FIG. 10A with a top lid removed for exposing the cocktail smoking powder held therein, in accordance with one embodiment of the present patent application.

Referring to FIG. 10B, in one embodiment, the container 130 may include a bottom container part 134 that holds wood powder 136 that may be burned. The container 130 may have a top lid 138 that covers the bottom container part 134.

Figure 11A:
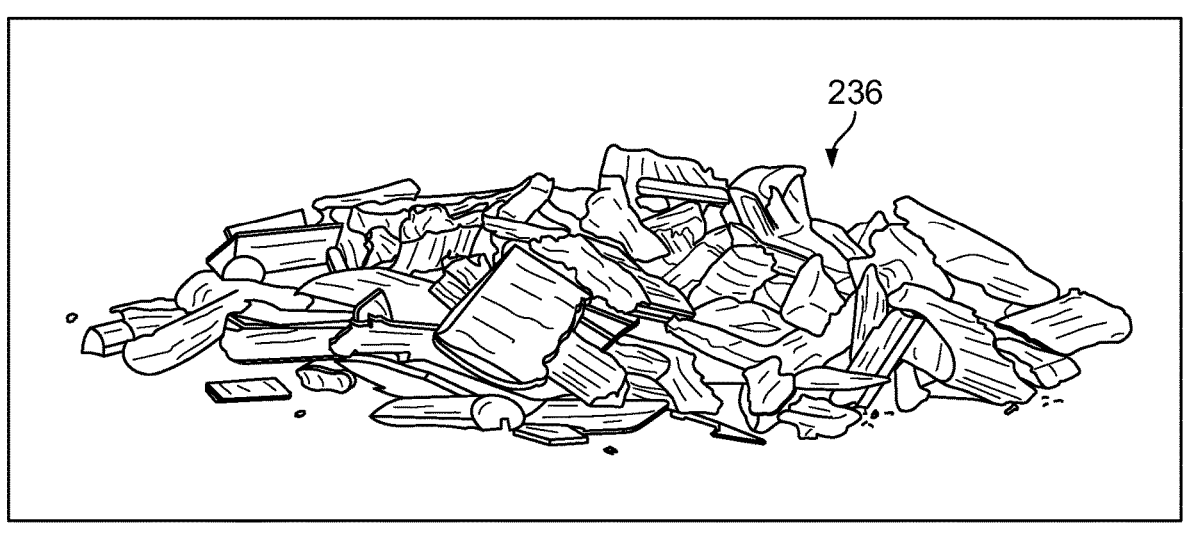
FIG. 11A shows a plurality of cocktail smoking chips that are burned for generating smoke that is infused into a cocktail or beverage, in accordance with one embodiment of the present patent application.

Referring to FIG. 11A, in one embodiment, wood chips 236 may be utilized for generating smoke that is infused into beverages. The wood chips 236 may be placed inside a combustion chamber of a chimney stack of one of the cocktail smoking chimneys disclosed herein. In one embodiment, the wood chips 236 are larger in size than the wood powder 136 shown and described above in FIG. 10B.

Figure 11B:
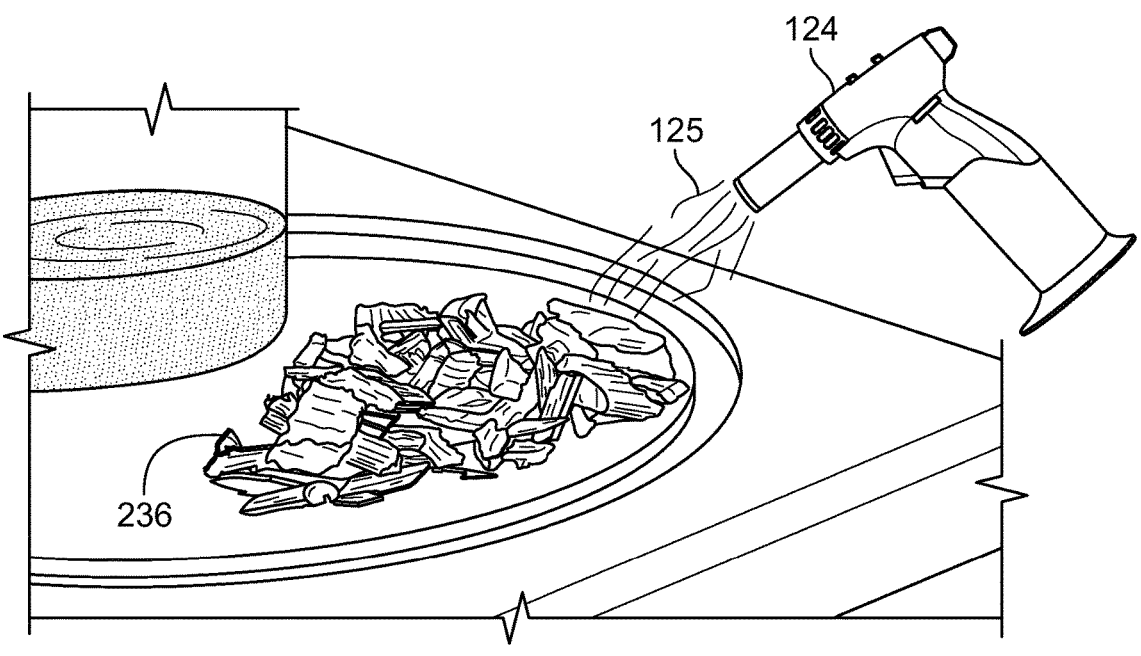
FIG. 11B shows a butane torch and a flame that is directed at the cocktail smoking chips for igniting the cocktail smoking chips of FIG. 11A to generate smoke.

Referring to FIG. 11B, in one embodiment, a butane torch 124 or other flame generating device may be utilized for generating a flame 125 that is directed at the wood chips 236 for igniting the wood chips to generate smoke that may be infused into a beverage or a drinking glass to generate a smoke-infused beverage (e.g., a smoking cocktail).

In one embodiment, the wood chips and wood powder may include one or more of the following wood types: apple, hickory, pecan, maple, cherry, and oak. In one embodiment, the wood chips and/or wood powder may include barrel-aged wood or mesquite infused wood.

In one embodiment, the spices that are burned inside the combustion chamber may include cinnamon, rosemary, and chai.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A cocktail smoking chimney for infusing smoke into a beverage comprising:
    a sealing base having a top major surface and a bottom major surface;
    a chimney stack projecting from the top major surface of said sealing base; said chimney stack forming a combustion chamber;
    one or more smoke transfer openings formed in said sealing base, each said smoke transfer opening having an upper end in communication with said combustion chamber and a lower end in communication with an underside of said sealing base;
    wherein said combustion chamber and each of said one or more smoke transfer openings formed in said sealing base provide fluid communication along a direct linear path.

2. The cocktail smoking chimney as claimed in claim 1, further comprising a screen disposed within said combustion chamber of said chimney stack.

3. The cocktail smoking chimney as claimed in claim 2, wherein said screen separates said combustion chamber from said one or more smoke transfer openings.

4. The cocktail smoking chimney as claimed in claim 1, wherein said chimney stack and said sealing base are formed from a single piece of wood consisting of apple, hickory, pecan, maple, cherry, oak, barrel-aged wood, and wood infused with mesquite.

5. The cocktail smoking chimney as claimed in claim 1, wherein said sealing base has a center, and wherein said chimney stack is aligned with the center of said sealing base.

6. The cocktail smoking chimney as claimed in claim 5, further comprising a smoke directing lip, wherein said smoke directing lip is aligned with the center of said sealing base.

7. The cocktail smoking chamber as claimed in claim 6, wherein the upper ends of said one or more smoke transfer openings are located inside said chimney stack and the lower ends of said one or more smoke transfer openings are surrounded by said smoke directing lip.

8. The cocktail smoking chimney as claimed in claim 1, wherein said sealing base has a central region having a first thickness and an outer perimeter having a second thickness that is less than the first thickness, and wherein the top and bottom major surfaces of said sealing base taper toward one another between the central region and the outer perimeter thereof.

9. The cocktail smoking chimney as claimed in claim 1, further comprising grooves in an outer surface of said chimney stack.

10. The cocktail smoking chimney as claimed in claim 1, wherein said one or more smoke transfer openings formed in said sealing base is a single smoke transfer opening having a circular diameter, wherein said combustion chamber and said smoke transfer opening provide fluid communication along a direct linear path.

11. The cocktail smoking chimney as claimed in claim 1, further comprising a screen within said direct linear path.

12. A cocktail smoking chimney for infusing smoke into a beverage comprising:

a sealing base having a central region, an outer perimeter, a top major surface that extends between the central region and the outer perimeter, and a bottom major surface that extends between the central region and the outer perimeter;

a chimney stack aligned with the central region of said sealing base and projecting above the top major surface of said sealing base;

a combustion chamber disposed within said chimney stack;

one or more smoke transfer openings formed in said sealing base, wherein each said smoke transfer opening extends in fluid communication from said combustion chamber out the bottom major surface of said sealing base;

wherein said combustion chamber and each of said one or more smoke transfer openings formed in said sealing base provide fluid communication along a direct linear path.

13. The cocktail smoking chimney as claimed in claim 12, wherein the central region of said sealing base has a first thickness and the outer perimeter of said sealing base has a second thickness that is less than the first thickness.

14. The cocktail smoking chimney as claimed in claim 13, wherein the top and bottom major surfaces of said sealing base taper inwardly toward one another between the central region of said sealing base and the outer perimeter of said sealing base.

15. The cocktail smoking chimney as claimed in claim 12, wherein said chimney stack has an open, upper end that is spaced away from the top major surface of said sealing base and a lower end that is connected with the top major surface of said sealing base.

16. The cocktail smoking chimney as claimed in claim 12, further grooves in an outer surface of said chimney stack.

17. A cocktail smoking chimney for infusing smoke into a beverage comprising:

a sealing base having a top major surface and a bottom major surface;

a chimney stack projecting from the top major surface of said sealing base, said chimney stack forming a combustion chamber;

a screen disposed in said combustion chamber; and, a smoke transfer opening formed in said sealing base, said smoke transfer opening having an upper end in communication with said combustion chamber and a lower end in communication with an underside of said sealing base;

wherein said combustion chamber and said smoke transfer opening formed in said sealing base provide fluid communication along a direct linear path.

18. The cocktail smoking chimney as claimed in claim 17, wherein said combustion chamber and said smoke transfer opening each have inner diameters, and where said inner diameter of said combustion chamber is greater than said inner diameter greater of said smoke transfer opening.

19. The cocktail smoking chimney as claimed in claim 18, wherein said sealing base tapers from a first thickness at said chimney stack to a second thickness at an outer edge thereof, said first thickness being greater than said second thickness.

20. The cocktail smoking chimney as claimed in claim 17, wherein said chimney stack includes grooves on an outer surface thereof.

* * * * *